United States Patent [19]
Suggitt et al.

[11] 3,852,372

[45] Dec. 3, 1974

[54] ISOMERIZATION WITH FLUORIDED COMPOSITE ALUMINA CATALYSTS

[75] Inventors: Robert M. Suggitt; John H. Estes, both of Wappingers Falls; Stanley Kravitz, Wiccopee, all of N.Y.

[73] Assignee: Texaco Inc., New York, N.Y.

[22] Filed: Feb. 2, 1972

[21] Appl. No.: 223,030

Related U.S. Application Data
[62] Division of Ser. No. 49,958, June 25, 1970, Pat. No. 3,717,586.

[52] U.S. Cl............. 260/683.68, 208/111, 208/112
[51] Int. Cl. .... B01j 11/16, C07c 5/24, C01b 33/28
[58] Field of Search ............ 208/112, 111; 260/667, 260/672 T, 683.68; 252/439, 441, 442

[56] References Cited
UNITED STATES PATENTS

| | | | |
|---|---|---|---|
| 2,479,109 | 8/1949 | Haensel | 252/442 |
| 2,642,384 | 6/1953 | Cox | 208/139 |
| 2,938,936 | 5/1960 | Belden | 260/683.68 |
| 2,952,715 | 9/1960 | Donaldson et al. | 260/666 |
| 3,008,895 | 11/1961 | Hansford et al. | 208/68 |
| 3,047,490 | 7/1962 | Myers | 208/59 |
| 3,138,559 | 6/1964 | Hauptschein et al. | 252/442 |
| 3,206,391 | 9/1965 | Gutberlet et al. | 208/110 |
| 3,213,012 | 10/1965 | Kline et al. | 208/110 |
| 3,242,101 | 3/1966 | Erickson et al. | 252/465 |
| 3,268,439 | 8/1966 | Tupman et al. | 208/112 |
| 3,269,936 | 8/1966 | Goldthwait et al. | 208/111 |
| 3,305,477 | 2/1967 | Peck et al. | 208/112 |
| 3,338,843 | 8/1967 | Goble et al. | 252/442 |
| 3,424,697 | 1/1969 | Notari et al. | 252/430 |
| 3,444,096 | 5/1969 | Turner et al. | 252/442 |
| 3,622,501 | 11/1971 | Bertolacini et al. | 208/111 |
| 3,625,860 | 12/1971 | Condrasky et al. | 252/415 |
| 3,649,523 | 3/1972 | Bertolacini et al. | 208/111 |
| 3,651,162 | 3/1972 | Pohlmann et al. | 208/672 |
| 3,651,163 | 3/1972 | Radford et al. | 208/672 |
| 3,673,108 | 6/1972 | Schutt | 252/411 R |
| 3,699,056 | 10/1972 | Takase et al. | 252/442 |

*Primary Examiner*—Delbert E. Gantz
*Assistant Examiner*—G. E. Schmitkons
*Attorney, Agent, or Firm*—T. H. Whaley; C. G. Ries

[57] ABSTRACT

A method for preparing a hydrocarbon conversion catalyst by providing a composite composed of alumina having associated therewith a Group VIB or VIII metal or compound and contacting the composite with an activator system comprising hydrogen and an organic fluoride compound having from 2 to 16 carbon atoms. The catalysts so prepared are useful in such hydrocarbon conversion processes as isomerization, hydrocracking, reforming, alkylation, disproportionation, polymerization and hydrogenation.

10 Claims, No Drawings

ISOMERIZATION WITH FLUORIDED COMPOSITE ALUMINA CATALYSTS

RELATED APPLICATION

This application is a division of Application Ser. No. 49,958 filed June 25, 1970, now U.S. Pat. No. 3,717,586.

BACKGROUND OF THE INVENTION

This invention relates to the preparation of fluorine containing catalysts and to their use in low temperature hydrocarbon conversion processes. In one of its specific aspects, this invention relates to a method of preparing a catalyst comprising a member of Group VIB or VIII of the Periodic Table, alumina and fluorine which is suitable for the conversion of hydrocarbons.

Fluorided catalysts are of interest for various processes including isomerization, reforming, alkylation, hydrogenation, disproportionation, cracking, polymerization and hydrocracking. Heretofore, activation of catalyst bases or composites by fluoriding was undertaken employing aqueous hydrogen fluoride or vaporized boron or ammonium fluorides. Such fluoriding techniques, however, by virtue of the fluoriding materials employed introduced various problems not the least of which included health, handling and equipment corrosion. In some instances unwanted surface deposits resulted from the treatment which interferred with the catalyst's ability to function. Moreover, such fluoriding techniques did not lend themselves to the replacement of fluorine lost during high temperature regeneration. Recently, other fluoriding compounds have been suggested such as carbon tetrafluoride and sulfur tetrafluoride. However, these materials in addition to their costliness present physiological difficulties.

It is therefore an object of this invention to provide a method for catalytically activating a composite material employing as a component of the activator system a fluoriding agent that introduces no equipment corrosion problems.

Another object of this invention is to provide a method for fluoriding catalysts with an agent that is physiologically inert.

Yet another object of this invention is to provide a method for fluoriding catalysts with a fluoriding system employing as fluoriding agent a material heretofore considered inert.

Still another object of this invention is to provide a hydrocarbon conversion process undertaken in the presence of a catalyst prepared or regenerated in situ under non-corrosive conditions in a hydrocarbon conversion reactor.

SUMMARY OF THE INVENTION

Broadly, this invention contemplates a method of preparing a catalyst comprising a hydrogenating component, alumina and from about 0.5 to 15.0 weight percent fluorine which comprises contacting alumina having associated therewith a hydrogenating component selected from the group consisting of metals of Groups VIB and VIII of the Periodic Table, their compounds and mixtures thereof with a combination of hydrogen and an organic fluoride compound containing from 2 to 16 carbon atoms at a temperature of from about 200° to 1,200°F.

According to our invention, catalytically active fluorided catalysts can be prepared employing an organic fluoride compound corresponding to the general formula:

$$C_nF_aH_bX_c$$

where X is nitrogen or oxygen and where $n$ is 2 to 16, $a$ is 1 to $2n+m$, $b$ is 0 to $2n+m-1$ and $c$ is 0 to 1. The value of $m$ is equal to 2 when $c$ equals 0 or when X is oxygen and $m$ is equal to 3 when X is nitrogen. Compounds contemplated as members of the activator system are difluoroethane, hexafluoroethane, hexafluoroacetone, octafluoropropane, 1-fluoro-2-methylpropane, decafluorodiethylether, hexafluorobenzene, hexadecafluoropropyloxacyclohexane ($C_5F_9DC_3F_7$), heptacosafluorotributylamine and tritriacontafluorohexadecylamine. It has been found that the organic fluoride compound is rendered chemically reactive in the presence of a Group VIB or VIII member and hydrogen such that an alumina composite can be activated and provided with a chemically combined fluorine content of from about 0.5 to 15.0, preferably 0.5 to 6.0 weight percent based on the catalyst.

The highly active hydrocarbon conversion catalysts contemplated herein are prepared from an alumina composite activated with a combination of hydrogen and a fluoride compound. As mentioned above, the alumina has associated therewith as a component of the composite a member selected from the group of metals of Groups VIB and VIII of the Periodic Table exemplified by chromium, molybdenum, tungsten, cobalt, nickel, platinum, palladium, ruthenium and rhodium. Combinations of metals are also contemplated such as nickel-tungsten and cobalt-molybdenum. The member may be present on the catalyst as metal or as a compound such as the oxide, sulfide or salt such as the sulfate. Preferably we employ platinum and palladium. In general, the catalyst may contain a member of Groups VIB and VIII in amounts of from 0.01 to 30 weight percent calculated as weight of metal. When Group VIII members such as platinum, palladium, rhodium and ruthenium are employed as composite components, we preferably employ from 0.1 to 2.0 weight percent. Combinations of metals such as nickel and tungsten are employed in greater amounts as for example 20 to 30 weight percent.

Aluminas in various forms may be used in this invention and particularly those aluminas having replaceable surface hydroxyl groups and surface areas of 50 to 800 square meters per gram using the BET method. Included within our definition of alumina, we mention for example eta-alumina, gamma-alumina, silica-stabilized alumina, i.e., aluminas containing approximately 5 weight percent $SiO_2$, thoria-alumina, zirconia-alumina, titania-alumina and chromia-alumina. Also contemplated are silica-aluminas having surface areas of from 100 to 600 square meters per gram and aluminosilicates having surface areas of from 600 to 800 square meters per gram. Preferably we employ aluminas having surface areas of from 50 to 400 square meters per gram and particularly eta- and gamma-alumina. Suitable composites contemplated for contacting with our fluoriding system include commercially available materials including platinum-alumina reforming catalysts. The composites are prepared by techniques well known to the art. Illustratively, a metal, such as platinum, is provided to the composite by impregnating active alumina with an aqueous solution of chloroplatinic acid and ethylene diamine followed by drying and calcining at about 1,050°F. for 2 hours thereby providing a platinized alumina composite. Where palladium is contemplated, it may similarly be introduced by providing a palladium tetramine complex as by dissolving palladium chloride in hydrochloric acid, diluting with water and concentrated ammonium hydroxide followed by heating at 140°F. with stirring for about 30 minutes until the precipitate originally formed is dissolved. The resulting solution is cooled and added to the alumina and after thorough mixing the alumina is dried at about 300°F. and thereafter calcined at elevated temperatures of from 800° to 1,200°F. for periods of at least 2 hours. In a similar manner Group VIB members are provided to the composite by impregnation with soluble salts of these metals, followed by calcination at 600° to 1,200°F. for several hours.

In accordance with our invention, a composite as hereinabove defined is contacted with a combination of hydrogen and an organic fluoride compound to introduce to the final catalyst about 0.5 to 15.0 weight percent chemically combined fluoride. Fluoriding in accordance with this invention enhances the acidity of the treated composite thereby promoting the catalyst's activity and improving its selectivity. Moreover, fluoriding provides the catalyst with activity at lower temperatures where the unfluorided composite would be inactive. Further, by fluoriding in the presence of hydrogen as a component of the activator system permits activation to be undertaken in the absence of deleterious carbonaceous deposit formation on the catalyst surface.

The ratio of hydrogen to fluoride compound during the contacting stage can vary from 0.5 to 100 gram moles of hydrogen per gram atom of fluorine in the compound and preferably within the range of 2 to 10 gram moles of hydrogen per gram atom of fluorine in the compound. Ratios of hydrogen less than 0.5:1 are undesirable because there is inefficient utilization of the fluoride compound and ratios above 100:1 are unnecessary because this greatly exceeds the optimum requirements of hydrogen consumption. The activating combination of hydrogen and fluoride compound may be introduced to the composite separately or as mixed streams and the activator components are permitted to flow through and over the composite. During contacting, the composite is generally maintained at a temperature of from 200° to 1,200°F. and preferably at a temperature of from 600° to 900°F. Depending on the activating temperature employed and the weight percent fluorine to be introduced to the composite, contact times ranging from one-half to twenty-four hours are employed. The catalyst can be prepared in situ in a hydrocarbon conversion reactor by passing a stream of hydrogen and the fluoride compound to the vessel directly containing the composite. The effluent from the reactor during activation contains water and methane.

As mentioned above, the composite is contacted with a combination of hydrogen and the fluoride compound. In the absence of the aforementioned member of Groups VI or VIII component of the composite, the fluoride compound is chemically inactive, particularly at temperatures of 900°F. and below, and the alumina is merely provided with adsorbed fluoride compound and not chemically combined fluoride. Merely adsorbing the compound onto the composite does not provide or promote activity nor improve selectivity. Unexpectedly, metal-alumina composites as described above when contacted with a combination of hydrogen and fluoride compound in some manner unknown to applicants permits reaction between the fluoride compound and the composite thereby providing the contemplated catalytically active material. Contacting as set out above is broadly undertaken at a temperature of at least 200° and up to 1,200°F. Preferably, initial contacting of the composite, hydrogen and fluoride compound is conducted as temperatures of at least 450°F. thereby initiating rapid fluoriding of the composite. Upon reaching a fluoride content of about 0.5 weight percent, subsequent contacting temperatures as low as 200°F. can be employed. However, at the lower temperatures the reaction is slow and results in inefficient use of fluoride compound. Initial or subsequent contact temperatures below 200°F. are generally insufficient to provide adequate reaction rates or highly active catalysts useful for commercial size operations in that fluoride levels of less than 0.5 weight percent result. In our highly preferred embodiment all contacting is conducted at temperatures of from about 450° to 900°F.

As contemplated herein, the inventive concept includes both initial activation and subsequent regeneration of the fluorided catalysts. It will be appreciated that during the course of hydrocarbon conversion, feedstocks employed may in some instances contain materials such as combined nitrogen in amounts exceeding 30 ppm or such other materials as arsenic, antimony or other known poisons such as alkali or alkaline earth metals which in the course of operation cause the catalyst to become deactivated. To rejuvenate catalyst activity, the deactivating materials are removed from the catalyst where they form volatile fluorides by contacting with the combination of hydrogen and fluoride compounds in a manner described above.

The catalyst prepared by our invention can be produced in pellet, granular, bead or pulverulent form to facilitate its use in fixed beds, moving beds or fluidized solid beds as is well known in the art. During the course of catalyst activation or regeneration, the effluent from the hydrocarbon conversion reactor consists largely of methane, water and unconverted fluoride compound. Any unconverted fluoride compound and excess hydrogen may be recycled.

The catalyst prepared herein is highly active for hydrocarbon conversion at relatively low temperatures of from 200° to 1,000°F. and finds application in a broad spectrum of conversion processes including hydrocracking, selective hydrocracking, hydroisomerization, disproportionation, alkylation, polymerization, reforming and hydrogenation. In general, the hydrocarbon feedstocks contain less than 30 ppm nitrogen and are converted in the presence of our catalyst at temperatures recited above.

Catalysts prepared according to our invention are admirably suited to convert a wide range of hydrocarbon materials. Illustratively, fluorided platinized aluminas are highly active for hydrocracking and hydroisomerizing such charge materials as waxes, slack wax and middle distillate oils at temperatures of 550° to 800°F., at pressures of 300 to 750 pounds per square inch gauge, liquid hourly space velocities of 1 to 20 in the presence of hydrogen. In general, catalysts containing lower fluorine contents require the higher conversion temperatures for equivalent rates of reaction. Selectivity for isomerization of normal $C_4$ to $C_6$ paraffins is improved at the lower temperatures. Aromatics can be hydrogenated and lubricating oil fractions can be modified to improve viscosity index and pour point. Fluorided aluminas having metal compounds such as the oxides associated therewith, exemplified by chromia and molybdena fluoride aluminas, show substantial activity for disproportionation of aromatics as for example the conversion of toluene to benzene and xylenes at 750° to 1,000°F. The catalysts are active for alkylation of aromatics and aliphatics and polymerization of olefins at temperatures of 200° to 400°F. and pressures of 300 to 800 p.s.i.g. The fluorided catalysts are active for hydrocarbon conversions at considerably lower temperatures than the non-fluorided composite. For example, fluorided platinized alumina permits isomerization of $C_4$ to $C_6$ n-paraffins at the 600°F. range whereas the non-fluorided composite is inactive at temperatures below 800°F.

In order to more fully illustrate the nature of our invention and manner of practicing the same, the following examples are presented. In these examples, the best mode contemplated by us for carrying out our invention is set forth.

EXAMPLE I 150 cc. of a commercially available 0.47 weight percent platinum on eta-alumina were calcined in air at 800°F. for 2 hours. Thereafter 120 grams of the calcined material was contacted with hydrogen in a reaction tube at 700°F., the hydrogen flowing at the rate of 10 liters per hour. After reducing the temperature to 600°F. 2 cc. of heptacosafluorotributylamine are introduced into the reactor at intervals of 15 minutes until a total of 16 cc. of fluoride compound are employed. The effluent gas from the reactor tube contains steam and is extremely acidic. An analysis of the fluorided platinized alumina composite shows it to contain 2.5 weight percent fluorine.

The catalyst was thereafter evaluated for isomerization and cracking activity employing as charge stock a normal paraffin feedstock having from 10 to 14 carbon atoms under conversion conditions of 650°F., a liquid hourly space velocity of 1, a hydrogen pressure of 500 p.s.i.g. and a hydrocarbon flow rate of 3 cubic feet per hour. Product analysis showed that 41.8 percent of the feed had been isomerized to branch chained paraffins in the range of $C_{10}$ to $C_{14}$ and 7.2 percent had been cracked to hydrocarbons having less than 10 carbons.

EXAMPLE II

To 120 cc. of a 0.47 weight percent platinum on etaalumina composite calcined for 1 hour at 800°F., there was added 10 cc. of heptacosafluorotributylamine. The fluoride compound was permitted to become absorbed into the platinized alumina composite while cooling in a closed container. The composite was thereafter transferred to a hydrocarbon conversion reactor for the cracking and isomerization of a normal paraffin charge stock as described in Example I. Employing the conversion conditions set out in Example I, catalyst activity at 650°F. resulted in a cracked fraction below $C_{10}$ of 0.6 percent and an isomerized fraction in the $C_{10}$ to $C_{14}$ range of 6.8 percent. To increase the activation rate, the temperature was increased to 700°F. Product analysis showed a cracked fraction below $C_{10}$ of 1.9 percent and an isomerized fraction in the $C_{10}$ to $C_{14}$ range of 30.6 percent. After an additional period of 6 hours, the catalyst activity resulted in a cracked fraction below $C_{10}$ of 2.7 percent and an isomerized fraction in the $C_{10}$ to $C_{14}$ range of 35.1 percent. As can be seen, our process can be performed in situ, i.e., within the hydrocarbon conversion reactor itself and the increase in activity noted above is related to the decomposition of the fluoride compound in the presence of hydrogen into an active fluorinating species under in situ activating conditions.

From the foregoing, it can be seen that we have provided a significantly useful process for the preparation of a catalyst useful in the conversion of hydrocarbons. Our catalyst is particularly useful in the isomerization of isomerizable hydrocarbons especially paraffinic hydrocarbons in the $C_{10}$ to $C_{14}$ range. Our catalyst can also be used in alkylation processes without varying the manipulative procedures to accommodate the catalyst prepared by our invention. Our process can be performed in situ, i.e., within the hydrocarbon conversion reactor itself and does not necessitate withdrawal of catalyst from the vessel for transfer to the hydrocarbon conversion reactor with the attendant problem of subjecting the catalyst to moisture. It should be further noted that our process can be performed to regenerate a spent catalyst by first heating the spent catalyst in air or oxygen to decarbonize the catalyst and then treating in the manner of our invention. Our process can be performed without the use of expensive chemicals, high pressures or temperatures and is thus suited for commercial operation. Our catalyst can contain any one of the aforementioned metals, for example, platinum, palladium, ruthenium and rhodium depending upon the choice of the particular operator, the availability of the metal, etc. The activation of the catalyst bases containing any of these metals proceeds essentially in the same way of activation of alumina base catalyst containing another metal of the group. Thus the manipulative procedure does not substantially vary from one metal to the other.

The terms and expressions which have been used herein are terms of description and not of limitation as there is no invention in the use of such terms and expressions of excluding any equivalents of the features shown and described or portions thereof as it is recognized that various modifications are possible within the scope of the invention.

We claim:

1. An isomerization process which comprises contacting a feedstock containing $C_{10}$-$C_{14}$ hydrocarbons at a temperature of from 200° to 1,000°F. in the presence of hydrogen with a catalyst comprising a hydrogenating component, alumina and from about 0.5 to 15.0 weight percent chemically combined fluorine, said chemically combined fluorine introduced by contacting alumina having associated therewith a hydrogenating component selected from the group consisting of the metals, oxides, sulfides and salts of the metals of Groups VIB and VIII of the Periodic Table and mixtures thereof with a combination of hydrogen and an organic fluoride compound containing from two to 16 carbon atoms corresponding to the formula $C_nF_aH_bX_c$ where X is nitrogen or oxygen and where $n$ is 2 to 16, $a$ is 1 to $2n+m$, $b$ is 0 to $2n+m-1$ and $c$ is 1, where $m$ is equal to 2 when X is oxygen and $m$ is equal to 3 when X is nitrogen, wherein the ratio of hydrogen to said fluoride compound is from 0.5 to 100 gram moles of hydrogen per gram atom of fluorine in said compound, at a temperature of from about 200° to 1,200°F.

2. A process according to claim 1 wherein said organic fluoride compound is selected from the group consisting of heptacosafluorotributylamine, and hexadecafluoropropyloxacyclohexane.

3. A process according to claim 1 wherein said hydrogenating component is present in said catalyst in an amount of from 0.01 to 30.0 weight percent calculated as weight of metal.

4. A process according to claim 1 wherein said component is selected from the group consisting of platinum, palladium, ruthenium, rhodium, nickel, cobalt, molybdenum, chromium and tungsten.

5. A process according to claim 1 wherein said component is selected from the group consisting of platinum, palladium, ruthenium and rhodium and where said component is present in said catalyst in an amount of from 0.1 to 2.0 weight percent.

6. A process according to claim 1 wherein said composite is contacted at a temperature of from 450° to 900°F.

7. A process according to claim 1 wherein said alumina is eta-alumina.

8. A process according to claim 1 wherein said alumina is gamma-alumina.

9. A process according to claim 1 wherein said alumina is an aluminosilicate.

10. A process according to claim 1 wherein said alumina is silica-alumina.

* * * * *